United States Patent [19]

Münzmay et al.

[11] Patent Number: 5,153,297

[45] Date of Patent: Oct. 6, 1992

[54] WATER-DISPERSIBLE, ELECTROLYTE-STABLE POLYETHERESTER-MODIFIED POLYURETHANE IONOMERS, A PROCESS FOR THEIR PRODUCTION AND THEIR USE IN ADMIXTURE WITH POLYMERS CONTAINING PERFLUOROALKYL GROUPS

[75] Inventors: Thomas Münzmay; Manfred Schmidt, both of Dormagen; Peter Nussbaum; Hans-Albert Ehlert, both of Leverkusen, all of Fed. Rep. of Germany

[73] Assignee: Bayer Aktiengesellschaft, Leverkusen Bayerwerk, Fed. Rep. of Germany

[21] Appl. No.: 803,237

[22] Filed: Dec. 5, 1991

[30] Foreign Application Priority Data

Aug. 12, 1990 [DE] Fed. Rep. of Germany ....... 4039193

[51] Int. Cl.$^5$ ...................... C08G 18/28; C08G 18/70
[52] U.S. Cl. ......................... 528/70; 528/66; 528/301; 528/312; 528/303; 528/356
[58] Field of Search ................... 528/70, 66, 301, 302, 528/303, 356

[56] References Cited

U.S. PATENT DOCUMENTS

| | | | |
|---|---|---|---|
| 4,207,128 | 6/1980 | Träubel et al. | 156/77 |
| 4,537,596 | 8/1985 | Müller et al. | 528/307 |
| 4,670,100 | 6/1987 | Henning et al. | 162/135 |
| 4,687,830 | 8/1987 | Weber et al. | 528/64 |

FOREIGN PATENT DOCUMENTS 2826232 12/1979 Fed. Rep. of Germany .
3011711 10/1981 Fed. Rep. of Germany .
3309992 9/1984 Fed. Rep. of Germany .

*Primary Examiner*—John Kight, III
*Assistant Examiner*—D. V. C. Trvong
*Attorney, Agent, or Firm*—Joseph C. Gil; Thomas W. Roy

[57] ABSTRACT

The present invention relates to water-dispersible polyetherester-modified polyurethane ionomers containing 10 to 100 milliequivalents of ionic, preferably cationic, groups per 100 g of ionomer; 2 to 40% by weight of polyetherester groups; and 1 to 35% by weight of ethylene oxide units, in which the percentages are based on the weight of the polyetherester-modified polyurethane ionomer.

The present invention also relates to a process for the preparation of these polyetherester-modified polyurethane ionomers and to aqueous compositions containing these polyetherester-modified polyurethane ionomers and polymers containing perfluoralkyl groups.

10 Claims, No Drawings

WATER-DISPERSIBLE, ELECTROLYTE-STABLE POLYETHERESTER-MODIFIED POLYURETHANE IONOMERS, A PROCESS FOR THEIR PRODUCTION AND THEIR USE IN ADMIXTURE WITH POLYMERS CONTAINING PERFLUOROALKYL GROUPS

BACKGROUND OF THE INVENTION

1. Field of the Invention

The present invention is directed to water-dispersible, electrolyte-stable polyetherester-modified polyurethane ionomers, a process for their production and their use in combination with polymers containing perfluoroalkyl groups as hydrophobizing and oleophobizing agents for textiles.

2. Description of the Prior Art

High quality aqueous dispersions of polyurethanes or polyurethane ureas are known and have been described, for example, in Angewandte Chemie, 82, (1970), pages 53 to 63; DE-OS 2,314,512; and 2,314,513.

The fact that many of these dispersions are free from external emulsifiers contributes to this high level. The dispersions contain chemically incorporated hydrophilic centers which are responsible for the self-emulsifiability of the otherwise hydrophobic polymers.

The hydrophilic centers incorporated in the known water-dispersible polyurethanes or polyurethane ureas include both salt-like, i.e. ionic groups and hydrophilic, nonionic groups.

The "polyurethane ionomers" include both polyurethanes containing chemically incorporated cations, in particular ammonium ions, and polyurethanes containing chemically incorporated anions, in particular sulfonate or carboxylate groups. The nonionic, water-dispersible polyurethanes include polyurethanes containing polyethylene oxide side chains according to DE-OS 2,314,512 and 2,314,513.

The dispersions of these polyurethanes have various characteristic property spectrums, depending on the nature of the hydrophilic center. Thus, because the solubility of the salt groups present in them is substantially independent of temperature, polyurethane ionomers dispersions will withstand heating to the boiling temperature; whereas, nonionic dispersions coagulate when heated to only moderate temperatures (approx. 60° C.) because the polyethylene oxide side chains gradually lose their solubility in water at these temperatures. In contrast to ionomers, however, these dispersions are resistant to the addition of almost unlimited quantities of electrolytes and are also stable after freezing and thawing.

Sensitivity to electrolytes is particularly high in the case of cationic polyurethanes. Aqueous dispersions of polyurethanes containing quaternary ammonium or tertiary sulfonium groups coagulate immediately, even if only very small quantities of an electrolyte containing monovalent ions, such as sodium chloride, are added in aqueous solution. On account of this property, the production and application of cationic polyurethane dispersions involves particular problems. Thus, water substantially free from ions generally has to be used for their production. "Hard" water leads to an unwanted increase in the size of the dispersed particles or to partial coagulation.

It is known from DE-OS 2,551,094, DE-OS 2,651,505 and DE-OS 2,730,514 that the sensitivity of aqueous polyurethane ionomers to electrolytes can be drastically reduced by the use of polyethers containing terminal and/or lateral polyethylene oxide. However, the use of polyethylene oxide units incorporated in the polymer results in hydrophilic properties which are permanent and thus seriously restrict the use of such ionically/nonionically modified polyurethanes for many applications, for example, for the crease-resistant finishing of fabrics.

It has now surprisingly been found that the known unfavorable properties of nonionically stabilized polyurethane ionomer dispersions can be avoided by incorporation of certain polyether ester groups in the polyurethane ionomer.

SUMMARY OF THE INVENTION

The present invention relates to water-dispersible polyetherester-modified polyurethane ionomers containing 10 to and preferably 15 to 50 milliequivalents of ionic, preferably cationic, groups per 100 g of ionomer; 2 to 40% by weight, preferably 5 to 35% by weight and more preferably 5 to 25% by weight of polyetherester groups; and 1 to 35% by weight, preferably 5 to 25% by weight of ethylene oxide units, in which the percentages are based on the weight of the polyetherester-modified polyurethane ionomer and in which the polyetherester-modified part of the molecule corresponds to the formula

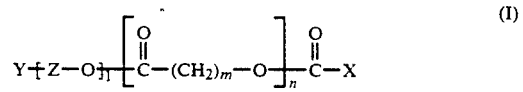

wherein
Y represents

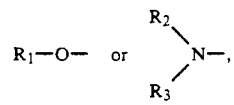

$R_1$ represents a saturated, aliphatic $C_{1-24}$, preferably $C_{4-18}$ hydrocarbon radical optionally containing 1 or 2 oxygen atoms in the form of ether groups; an unsaturated, aliphatic $C_{2-24}$, preferably $C_{4-18}$ hydrocarbon radical; a saturated or unsaturated, cycloaliphatic $C_{3-8}$, preferably $C_{5-7}$ hydrocarbon radical optionally containing 1 to 3 hetero atoms from the group of oxygen, sulfur and nitrogen; an aromatic $C_{6-10}$ hydrocarbon radical, preferably phenyl or naphthyl; an araliphatic hydrocarbon radical containing 6 to 10 carbon atoms in the aryl moiety, preferably phenyl or naphthyl, and 1 to 14 carbon atoms in the aliphatic moiety, $R_2$ and $R_3$ may be the same or different and represent a saturated, aliphatic $C_{1-18}$, preferably $C_{1-8}$ hydrocarbon radical; an unsaturated, aliphatic $C_{2-18}$, preferably $C_{2-8}$ hydrocarbon radical; a saturated or unsaturated, cycloaliphatic $C_{3-8}$, preferably $C_{5-7}$ hydrocarbon radical optionally containing 1 to 3 hetero atoms from the from the group of oxygen, sulfur and nitrogen; an aromatic $C_{6-10}$ hydrocarbon radical, preferably phenyl or naphthyl; an araliphatic hydrocarbon radical containing 6 to 10 carbon atoms in the aryl moiety, preferably phenyl or naphthyl, and 1 to 14 carbon atoms in the aliphatic moiety;

Z represents the components (a) and (b)

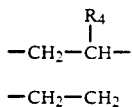

wherein
- $R_4$ represents a saturated, aliphatic $C_{1-18}$ hydrocarbon radical, preferably methyl; or an araliphatic hydrocarbon radical containing 6 to 10 carbon atoms in the aryl moiety, preferably phenyl or naphthyl, and 1 to 14 carbon atoms in the aliphatic moiety, the percentage content of component (a) in Z being from 0 to 40% by weight, preferably from 0 to 20% by weight, and the percentage content of component (b) in Z being from 60 to 100% by weight, preferably from 80 to 100% by weight; components (a) and (b) being distributed either randomly and/or in blocks;
- X represents —NH—, —O— or —$(CH_2)_{1-4}$, preferably —NH—,
- l is 5 to 60, preferably 25 to 50,
- m is 4 or 5 and
- n is 1, 2, 3, 4 or 5.

The present invention also relates to a process for the preparation of these polyetherester-modified polyurethane ionomers and to aqueous compositions containing these polyetherester-modified polyurethane ionomers and polymers containing perfluoroalkyl groups.

DETAILED DESCRIPTION OF THE INVENTION

The polyetherester-modified polyurethane ionomers according to the invention are produced, for example, by reacting a polyurethane skeleton, which preferably contains no ionomeric groups, with a monohydroxy polyetherester corresponding to formula (II)

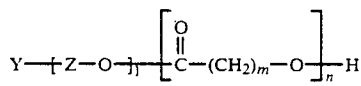

wherein
Y, Z, l, m and n are as defined above,
and subsequently introducing the ionic groups by the reaction of a compound containing an ionic group or a group convertible into an ionic group and containing at least one other isocyanate-reactive group with an isocyanate-containing intermediate.

The polyetherester modification is preferably carried out before or at the same time as the reaction of isocyanate-containing compounds with isocyanate-reactive compounds A).

The polyurethane skeleton is a polyaddition product of (substantially) isocyanate-reactive reactants and polyisocyanates or derivatives thereof.

Synthesis components from the group of
A) isocyanate-reactive compounds and
B) organic isocyanates
may be used for the production of the polyurethane skeleton.

Isocyanate-reactive compounds A) include relatively high molecular weight polyhydroxyl compounds having a molecular weight of 500 to 10,000, preferably 500 to 5,000, selected from the group of polyethers, polyesters, polylactones and polycarbonates. These compounds are described, for example, in DE-AS 1 770 068, pages 11 to 14, (U.S. Pat. No. 3,756,992, herein incorporated by reference).

Other suitable isocyanate-reactive compounds A) include polyfunctional alcohols and/or amines having a molecular weight of 18 to 499, preferably 18 to 300, e.g., 1. known saturated or unsaturated diols, such as ethylene glycol and condensates thereof, butane-1,3-diol, butane-1,4-diol, butene-1,4-diol, propane-1,2-diol, propane-1,3-diol, 2,2-dimethylpropane-1,3-diol (neopentyl glycol), hexane-1,6-diol, 1,4-bishydroxymethyl cyclohexane, ethoxylation products of aromatic polyols (such as hydroquinone or 4,4'-dihydroxydiphenyl-2,2-propane), low molecular weight esters (such as terephthalic acid bisglycol ester), succinic acid di-β-hydroxyethyl amide and di-, tri- or tetrapropylene glycol, 2. aliphatic, cycloaliphatic and aromatic polyamines such as ethylenediamine, hexamethylenediamine, hydrazine, adipic acid dihydrazide, piperazine, 1-amino-3,3,5-trimethyl-5-aminomethyl cyclohexane (isophoronediamine) and diethylenetriamine, 3. aminoalcohols such as ethanolamine, propanolamine, N-methyl ethanolamine and diethanolamine, and 4. water.

Organic isocyanates B) include organic polyisocyanates having functionalities of 2 to 3, preferably organic diisocyanates of the type described, for example, by W. Siefken in Justus Liebigs Annalen der Chemie, 562, pages 75 to 136. Preferred organic diisocyanates include 1,6-hexamethylene diisocyanate, 1,4-diisocyanatocyclohexane, 1-isocyanato-3,3,5-trimethyl-5-isocyanatomethyl cyclohexane (isophorone diisocyanate), 4,4'-diisocyanatodicyclohexyl methane, xylylene diisocyanate, 4,4'-diisocyanatodicyclohexyl-2,2-propane, 1,4-diisocyanatobenzene, 2,4-diisocyanatotoluene, 2,6-diisocyanatotoluene, 4,4'-diisocyanatodiphenyl methane, 2,4'-diisocyanatodiphenyl methane and mixtures of these diisocyanates.

The polyisocyanates of relatively high functionality which are known in polyurethane chemistry and also the known, modified polyisocyanates containing carbodiimide groups, oxadiazintrione groups, uretdione groups, allophanate groups, isocyanurate groups, urethane groups and/or biuret groups, may also be used as synthesis component B).

Monoisocyanates such as phenyl isocyanate, hexyl isocyanate, dodecyl isocyanate or stearyl isocyanate may also be used in small quantities as synthesis component B).

In one preferred embodiment dihydroxy or polyhydroxy compounds (of the type described, for example, in DE-A 2,400,490), monoamino and/or diamino compounds are used as synthesis component A) and monoisocyanates and/or polyisocyanates as synthesis component B) in the production of the polyurethane skeleton, components A) and/or B) containing one or more substituents R per molecule wherein R is a saturated or unsaturated, monofunctional aliphatic hydrocarbon radical containing 1 to 35 carbon atoms, preferably 9 to 22 carbon atoms, a monofunctional, aromatic hydrocarbon radical containing 6 to 10 carbon atoms or a monofunctional, araliphatic hydrocarbon radical containing 7 to 10 carbon atoms, provided that when several substituents R are present in the same molecule, different substituents corresponding to the above definition may be present.

In another preferred embodiment of the invention, the polyurethane skeleton contains acylated urea groups corresponding to the formula $$-NH-CO-N-CO-R \qquad (III)$$
$$\phantom{-NH-CO-}|$$

wherein
R is as defined above.

The quantity of the components are selected such that 0.1 to 20% by weight, based on solids, of the structural units corresponding to formula IV are present in the polyisocyanate adduct $$-NH-CO-N-CO \qquad (IV)$$
$$\phantom{-NH-CO-}|$$

The acyl urea groups corresponding to formula (III) may be introduced into the polyurethane skeleton by using synthesis components B) containing carbodiimide groups and subsequently reacting them with monocarboxylic acids corresponding to the formula $$R-COOH \qquad (V)$$

wherein
R is as defined above.

The carbodiimide groups are preferably produced in known manner (cf. Angew. Chem. 74, 801–806 (1962)) before or during the polyaddition reaction by partial carbodiimidization of synthesis components B) in the presence of an organophosphorus catalyst. The resulting intermediate products containing carbodiimide groups are reacted with synthesis components A) and the carbodiimide groups are subsequently converted into acyl urea groups corresponding to formula III by reaction with monocarboxylic acids corresponding to formula V.

Examples of carboxylic acids corresponding to formula V include 2-ethyl hexanoic acid, decanoic acid, dodecanoic acid, myristic acid, palmitic acid, stearic acid, behenic acid, oleic acid, linolenic acid, linoleic acid, benzoic acid, cinnamic acid and naphthoic acid.

The carboxylic acids may also be used in the form of mixtures of the type obtained from natural raw materials, for example, from coconut oil or fish oil fatty acids.

Polyetherester-modified polyurethane ionomers synthesized from these modified polyurethane skeletons are particularly suitable for the mixtures with perfluoroalkylfunctional polymers which are to be used as hydrophobicizing and oleophobicizing agents.

The monohydroxy polyetheresters corresponding to the formula II which are used in the production of the polyetherester-modified polyurethane ionomers according to the invention may be obtained by the esterification of monohydroxy polyethers corresponding to the formula $$Y+Z-O+_l H \qquad (VI)$$

wherein Y, Z and l are as defined above, in known manner with lactones i.e. valerolactone, ε-caprolactone or mixtures of these lactones.

The reaction may be carried out at temperatures of 50 to 250° C., depending upon the type of catalyst used (for example BF$_3$ etherate, tin activators according to U.S. Pat. No. 3,284,417). However, the reaction is preferably carried out at a temperature above 150° C. in the absence of a catalyst.

The polyetherester modification of polyurethane ionomers or polyurethane ionomer precursors to form polyetherester-modified polyurethane ionomers according to the invention is preferably carried out by addition of the monohydroxy polyetherester II onto isocyanate groups present in terminal and/or lateral positions on the basic polyurethane skeleton.

The polyetherester-modified polyurethane ionomers according to the invention may be anionic or cationic, preferably cationic. The ionic groups are preferably introduced by the reaction of compounds containing ionic groups or groups convertible into ionic groups and containing at least one other isocyanate-reactive group with an isocyanate-containing prepolymer to form the polyetherester-modified polyurethane ionomers according to the invention.

Carboxylate and/or sulfonate groups are preferably used as the anionic groups. The compounds containing anionic groups or precursors thereof include, for example, aliphatic diols containing sulfonate groups according to DE-OS 2,446,440 (U.S. Pat. No. 4,108,814, herein incorporated by reference) or DE-OS 2,437,218 (U.S. Pat. No. 4,056,564, herein incorporated by reference); diols and/or diaminosulfonates containing carboxylate groups or carboxyl groups convertible into carboxylate groups of the type described in CA-PS 928,323, for example, the sodium salt of N-(2-aminoethyl)-2-aminoethane sulfonic acid, dimethylol propionic acid or salts thereof and the sodium salt of N-(2-aminoethyl)-2-propionic acid.

The potential ionic groups may be completely or partly converted into the corresponding ionic groups before or during mixing of the polyurethane with water by the addition of neutralizing agents, e.g., tertiary amines such as triethyl amine and triisopropyl amine, or by means of bases such as sodium hydroxide or ammonia.

The dispersions of the preferred cationic polyetherester-modified polyurethane ionomers may be obtained by using hydroxyl and/or amine components containing tertiary nitrogen such as N-methyl diethanolamine, N-ethyl diethanolamine or N-alkyl-diethanol-amine with an alkyl-chain with more than 2 carbon atoms, N-methyl diisopropanolamine, N,N'-dihydroxyethyl piperazine, triethanolamine, trisisopropanolamine, N,N'-dimethyl ethanolamine, N-methylbis-(3-aminopropyl)-amine and N-methyl-bis-(2-aminoethyl)-amine. The cationic groups may be formed before or during mixing of the polyetherester-modified polyurethanes with water by reacting the tertiary amine groups with inorganic or organic acids (such as HCl, acetic acid, lactic acid, cyanoacetic acid, phosphoric acid and sulfuric acid) or by reaction with quaternizing agents (such as dimethyl sulfate, benzyl chloride, bromoacetamide and chloroacetamide) to form the corresponding ammonium compounds.

Cationic groups may also be introduced into the polyurethane in the form of secondary or primary amines terminally and/or laterally incorporated in the polymer which are converted to corresponding ammonium ions by quaternization or protonation with the quaternizing agents and/or protonating agents previously mentioned.

If monohydroxy polyethers corresponding to formula VI in which

Y represents

wherein
R₂ and R₃ are as defined above,
are used in the production of the polyetherester-modified polyurethane ionomers according to the invention, these tertiary amino groups may also be converted to cationic groups.

The polyetherester-modified polyurethane ionomers according to the invention and aqueous dispersions thereof may be prepared in known manner (cf. for example Houben-Weyl, Methoden der organischen Chemie; Vol. E20, pages 1673-1681 (1987), Georg Thieme Verlag, Stuttgart/New York).

A diisocyanate or polyisocyanate or a mixture thereof is preferably carbodiimidized in a first step in the presence of a catalyst, for example a commercial mixture of 1-methyl-1-phospha-2-cyclopentene-1-oxide and 1-methyl-1-phospha-3-cyclopentane-1-oxide, until the desired content of carbodiimide groups is reached.

The resulting diisocyanate or polyisocyanate containing carbodiimide groups is then reacted in known manner with polyhydroxyl compounds having a molecular weight above 500 and/or isocyanate-reactive reactants having a molecular weight from 18 to 499 to form an isocyanate-functional or hydroxyfunctional prepolymer. The polyetherester modification of the polyurethane skeleton by the reaction of the monohydroxy polyetherester II with isocyanate groups is preferably carried out before or during the reaction of the diisocyanate or polyisocyanate containing carbodiimide groups with isocyanate-reactive components A).

In a further preferred variant the addition of the monohydroxy polyetherester is carried out before the dimerisation of the carbodiimide by reaction of the monohydroxy polyetherester (II) with a di- or polyisocyanate or a mixture of di- and/or polyisocyanates.

The carbodiimide groups of the resulting prepolymer are converted into acyl urea groups (III) by reaction with the above-mentioned monocarboxylic acids (V) In the case of a hydroxyfunctional prepolymer, the resulting prepolymer is subsequently converted into an isocyanate-functional prepolymer by reaction with di- and/or polyisocyanates.

Polyetherester-modified polyurethane ionomers according to the invention are obtained by the reaction of the previously described reaction products with a compound containing isocyanate-reactive groups and either ionic groups or potential ionic groups. If potential ionic groups are incorporated, they are subsequently converted into ionic groups. The resulting polyetherester-modified polyurethane ionomers according to the invention will then be converted into aqueous dispersions having a solids content of 10 to 60% by weight, preferably 20 to 40% by weight, by the addition of water.

To obtain the desired viscosity, a solvent (such as acetone, methyl ethyl ketone, tetrahydrofuran, N-methyl pyrrolidone, propyl glycol diacetate or methoxypropyl acetate) may be used at any stage in the synthesis of the polymer. The preferred solvent is acetone which may readily be removed from the aqueous dispersion of polyetherester-modified polyurethane ionomers according to the invention by vacuum distillation.

The mixtures of the polyetherester-modified polyurethane monomer dispersions according to the invention with polymers containing perfluoroalkyl groups are used in particular as textile treatments for hydrophobizing and oleophobizing textiles. They may be present in the form of aqueous dispersions having a solids content of 10 to 50% by weight, preferably 15 to 40% by weight.

Suitable polymers containing perfluoroalkyl groups include commercially available perfluoroalkyl polymers from the series of perfluoroalkyl-functional vinyl, styrene, vinylidene, methacrylate and α-chloroacrylate polymers containing 4 to 20 carbon atoms in the perfluoroalkyl monomer. Examples of these products include polymers and copolymers of the following compounds:

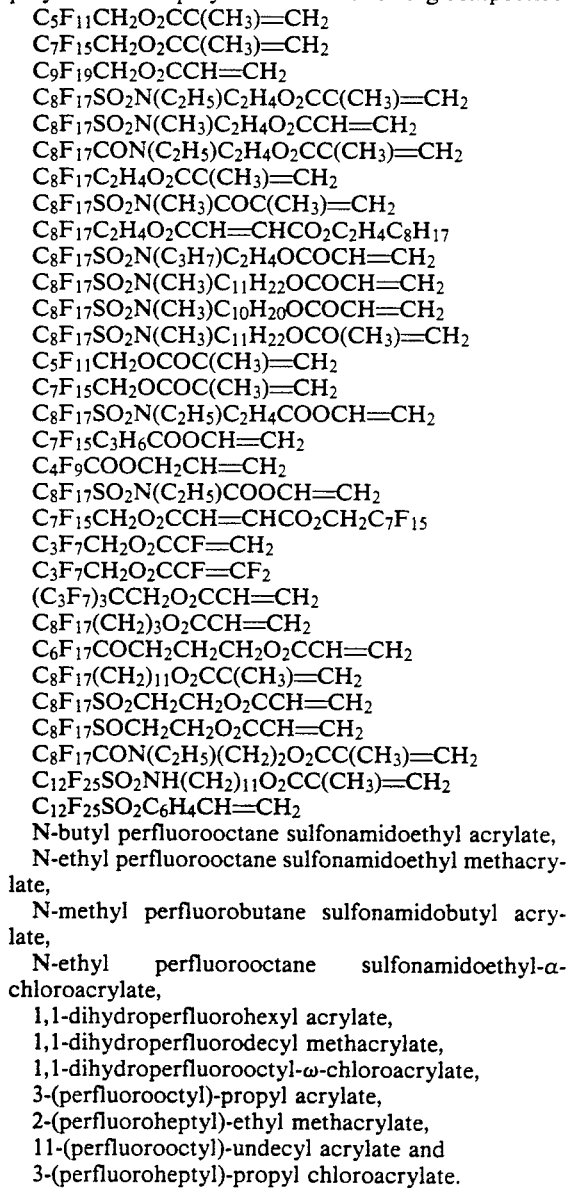

N-butyl perfluorooctane sulfonamidoethyl acrylate,
N-ethyl perfluorooctane sulfonamidoethyl methacrylate,
N-methyl perfluorobutane sulfonamidobutyl acrylate,
N-ethyl perfluorooctane sulfonamidoethyl-α-chloroacrylate,
1,1-dihydroperfluorohexyl acrylate,
1,1-dihydroperfluorodecyl methacrylate,
1,1-dihydroperfluorooctyl-ω-chloroacrylate,
3-(perfluorooctyl)-propyl acrylate,
2-(perfluoroheptyl)-ethyl methacrylate,
11-(perfluorooctyl)-undecyl acrylate and
3-(perfluoroheptyl)-propyl chloroacrylate.

Acrylate (co)polymers containing 20 to 45% by weight, preferably 35 to 45% by weight fluorine, based on solids, are preferred.

The mixing ratio of polyetherester-modified polyurethane ionomer to polymer containing perfluoroalkyl groups is preferably 1:0.5 to 1:10, more preferably 1:1 to 1:5, based on the solids.

The aqueous dispersions according to the invention may contain other textile auxiliaries such as synthetic resins. These other constituents are preferably nonionic or cationic.

The aqueous dispersions of the mixtures according to the invention are preferably diluted with water before application to the textile materials. The quantities used are selected so that the substance according to the invention is applied in a quantity of 0.5 to 15 g, preferably 0.5 to 8 g of solids per kg textile material.

Natural and synthetic materials such as fibers, filaments, yarns, nonwovens, woven fabrics and knitted fabrics of, in particular, cellulose and cellulose derivatives and also polyester, polyamide and polyacrylonitrile materials, wool or silk, may be successfully treated with the mixtures according to the invention.

The hydrophobized or oleophobized textile materials (such as nonwovens or preferably woven fabrics) are used for example for the production of umbrella coverings, tents, water-repellent clothing or coverings, balloon covers, awnings, textile floor coverings, packaging materials or footwear.

The treatment may be carried out by known methods, preferably by the exhaust method or by padding, for example at temperatures between room temperature and 40° C., and also by the kiss-roll coating or by spraying and subsequent heat treatment at 80° to 180° C., preferably 120° to 150° C.

In the following examples, all parts and percentages are by weight unless otherwise specified.

Preferred polyetherester-modified polyurethane ionomers have average particle diameters of greater than 30 nm, preferably from 35 to 300 nm and, more preferably, from 50 to 150 nm.

The average particle sizes of aqueous dispersions were determined by laser correlation spectroscopy (Malvern Autosizer II, Malvern Inst. Limited).

EXAMPLE 1

Preparation of a monohydroxy polyetherester corresponding to formula (II):

75 kg of a monofunctional polyether (OH value 25) obtained by the addition of 63% by weight ethylene oxide and 16% by weight propylene oxide in the form of a mixed block and the subsequent addition of 21% by weight ethylene oxide onto glycol monobutyl ether and 7.98 kg ε-caprolactone were introduced into a 100 liter stirred vessel and stirred for 12 h at 200° C. The polymer obtained had the following properties:

| OH value (mg KOH/g): | 22 mg KOH/g |
| viscosity (25° C.): | 680 mPas |

EXAMPLE 2

Preparation of an aqueous dispersion of a polyetherester-modified polyurethane ionomer according to the invention:

296 g of a mixture of 2,4-tolylene diisocyanate and 2,6-tolylene diisocyanate were carbodiimidized with 0.3 g of a 20% solution of a mixture of 1-methyl-1-phospha-2-cyclopentene -1-oxide and 1-methyl-1-phospha-3-cyclopentene-1-oxide in N-methyl pyrrolidone at 60° to 65° C. At an isocyanate content of 20 to 21%, 0.3 g phosphorus trichloride, 153 g of the ethylene oxide compound of Example 1 and 95.8 g 1,4-butanediol were successively added. The resulting highly viscous prepolymer was dissolved in 1.02 kg acetone. 215 g stearic acid and, 30 minutes later, 127 g of a mixture of 2,4-tolylene diisocyanate and 2,6-tolylene diisocyanate were added to the prepolymer solution which had a temperature of 50° to 60° C. The isocyanate-terminated prepolymer was chain-extended by reaction with 23.5 g N-methyl diethanolamine and dispersed with a solution of 20 g lactic acid in 2.05 kg deionized water. After removal of the acetone by vacuum distillation, a stable dispersion having the following properties was obtained:

Solids: 30.5%
Average particle size: 66 nm
Viscosity: 17 s (DIN 4 mm) (corresponding to a flow time of 17 seconds, as determined in accordance with DIN 53 211 using a DIN 4 mm cup)

EXAMPLE 3 (comparison)

Cationically modified polyurethane

Aqueous cationically modified PU dispersion according to Example 1 of U.S. Pat. No. 4,670,100

A mixture of 90.7 parts of a mixture of 2,4-tolylene diisocyanate and 2,6-tolylene diisocyanate was carbodiimidized with a solution of a mixture of 0.1 ml 1-methyl-1-phospha-2-cyclopentene -1-oxide and 1-methyl-1-phospha-3-cyclopentene -1-oxide in N-methyl pyrrolidone. The reaction was terminated with 0.1 ml of phosphorus trichloride at an NCO value of 20.6%. 32.2 parts butane-1,4-diol and 52.0 parts acetone were then added. After 30 minutes, the NCO value had fallen to 0%. 64.8 parts stearic acid were then added and the mixture stirred for 40 minutes until the acid value was 0. A further 82.2 parts of a mixture of 2,4-tolylene diisocyanate and 2,6-tolylene diisocyanate were then added and the mixture was reacted to an NCO value of 8.0%. After dilution with 200 parts acetone, 29.9 parts N-methyl diethanolamine and 6.4 parts n-butanol were added to the reaction mixture. At an NCO value of 0%, the reaction mixture was converted into a salt with 22.6 parts DL lactic acid and then dispersed in 731 parts water. After removal of the acetone by distillation under reduced pressure, a stable dispersion having the following data was obtained:

Solids: 31.0%
Viscosity: 22 s (DIN 4 mm)
Average particle size: 40 nm

EXAMPLE 4 (comparison)

Cationically/nonionically modified polyurethane according to Example 6 of U.S. Pat. No. 4,670,100

174 Parts (1.0 mole) of a mixture of 2,4-tolylene diisocyanate and 2,6-tolylene diisocyanate (ratio 65:35) were carbodiimidized at 60° C. with 0.2 ml of a solution of a mixture of 1-methyl-1-phospha-2-cyclopentene-1-oxide and 1-methyl-1-phospha -3-cyclopentene-1-oxide in N-methyl pyrrolidone (1:6) as catalyst. At an NCO value of 27.7%, the reaction was terminated with 0.2 ml phosphorus trichloride and the reaction mixture was stirred for 30 minutes. A constant NCO value of 25.8% was established. 101.8 parts (0.36 mol) stearic acid were added to the reaction product at 60° C., followed by reaction for 2 hours. The reaction product obtained, which contained acylated urea groups, had an NCO content of 16.6%. 100 parts (0.117 moles) of a polyester diol of adipic acid and hexanediol (OH value 133.6) and 12 parts by weight of a butanol-started polyethylene oxide/polypropylene oxide polyether (OH value: 26, 73.3% ethylene oxide) were dehydrated for 30 minutes at 110° C. in a water jet vacuum. After cooling to 80° C., 32.1 parts (0.145 moles) of isophorone diisocyanate (3-isocyanatomethyl-3,5,5-trimethyl cyclohexyl isocyanate) and 78.9 parts (0.145 moles) of the above-mentioned polyisocyanate containing acylated urea groups were added and the temperature was increased to 100° C. A constant NCO value of 3.4% was established. 4.2 parts by weight of n-butanol were then added, after which the mixture was diluted with 900 ml acetone and the temperature was reduced to 50° C. At 50° C., the reaction mixture was chain-extended with 1.1 part (0.022 moles) of hydrazine hydrate and, after 5 minutes, with 6.37 parts (0.044 moles) of N,N-bis-(3-aminopropyl)-methyl amine in 50 parts acetone. After 10 minutes, the reaction mixture was converted into salt form with 3.95 parts (0.044 moles) DL-lactic acid in 20 parts water and, after another 10 minutes, was dispersed with 550 parts water. The acetone was distilled off under vacuum immediately afterwards. A fine-particle dispersion having the following data was obtained:

Solids: 30.0%
Viscosity: 18 s (DIN 4 mm)
Average particle size: 80 nm.

EXAMPLE 5 (electrolyte stability)

Quantities of 20 g of the polyurethane dispersions of Examples 2, 3 and 4 were diluted with 1,000 g of a 0.6% aqueous zinc nitrate solution and stored for 8 hours at room temperature. Thereafter, the stability of the solution was optically evaluated.

| | Stability |
|---|---|
| Example 2 | Slightly opalescent solution |
| Example 3 | Heavy precipitation |
| Example 4 | Slightly opalescent solution |

EXAMPLE 6 (Application Example)

Commercial synthetic resins and corresponding catalysts were used for the surface stabilization of textile substrates of cotton and cotton/synthetic fibers and for stiffening polyacrylate awning materials:

Synthetic resin S: Fixapret CPN (methylolation product of glyoxal monourein)
Catalyst: zinc nitrate
Component II: aqueous dispersion of a perfluoroalkylene-functional acrylate copolymer having a fluorine content of approx. 40% by weight, based on solids, and a solids content of approx. 15% by weight, based on the weight of the dispersion (Baygard CA 40 083, a product of Bayer AG).

A cotton gabardine fabric weighing approx. 240 g per square meter was treated with formulations A), B) and C):

| | A) (invention) | B) | C) | |
|---|---|---|---|---|
| Synthetic resin X | 60 | 60 | 60 | g/l |

-continuedc

| | A) (invention) | B) | C) | |
|---|---|---|---|---|
| Catalyst | 4 | 4 | 4 | g/l |
| Component II | 20 | 20 | 20 | g/l |
| Example 2 (invention) | 10 | — | — | g/l |
| Example 3 | — | 10 | — | g/l |
| Example 4 | — | — | 10 | g/l |

The cotton fabric was impregnated with the formulations in a trough and squeezed between two rubber rollers (padding). The uptake of the formulations amounted to 70%, based on the weight of the fabric. The samples were dried at 100° C. and condensed for 5 minutes at 150° C.

The treated fabrics were tested by the following method:

After conditioning for 24 hours at 20° C. ±2° C./65% relative humidity, the treated textile samples were subjected to the following tests:

1. Rain test in accordance with DIN 53 888 using a Dr. Bundesmann rain tester. Evaluation
    drop repellent time in minutes
    drop repellent effect in marks of 5 to 1 mark
    5 = strongest drop repellent effect mark 1 = poorest drop repellent effect
    water absorption
2. The oil repellency test was carried out in accordance with AATCC test method 118-1978.

The oil repellency mark corresponded to the most highly numbered test liquid which does not wet the fiber material within 30 seconds:

mark 1 = lowest value
mark 8 = highest value.

The test produced the following results:

| | | A) (invention) | B) | C) |
|---|---|---|---|---|
| 1. | Drop repellent time [mins.] | 10 | 10 | 10 |
| | Drop repellent effect (marks 5-1) | 5 | 5 | 5 |
| | water absorption [%] | 2.9 | 2.0 | 2.9 |
| 2. | Oil repellency (marks 8-1) | 4 | 4 | 4 |

EXAMPLE 7 (Application Example - permanence)

The cotton samples treated in accordance with Example 6 were washed 5 times at 40° C. with a domestic detergent in a Miele W 763 washing machine (easy-care cycle) and dried at 80° C. in a Miele domestic dryer.

The test produced the following results:

| | | A) (invention) | B) | C) |
|---|---|---|---|---|
| 1. | Drop repellent time [mins.] | 10 | 10 | 0 |
| | Drop repellent effect (marks 5-1) | 5 | 5 | 1 |
| | Water absorption [%] | 7.8 | 6.9 | 34 |
| 2. | Oil repellency (marks 8-1) | 3 | 3 | 2-3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible polyetherester-modified polyurethane ionomer containing 10 to 100 milliequivalents of ionic groups per 100 g ionomer, 2 to 40% by weight of polyetherester groups and 1 to 35% by weight of ethylene oxide units, in which the percentages are based on the weight of the polyurethane ionomer and in which the polyetherester-modified portion of the polyurethane ionomer corresponds to the formula $$Y\!-\!\!\left[Z\!-\!O\right]_{l}\!\!\left[\!\begin{matrix}O\\\|\\C\!-\!(CH_2)_m\!-\!O\end{matrix}\!\right]_{n}\!\!\begin{matrix}O\\\|\\C\!-\!X\end{matrix} \qquad (I)$$

wherein
Y represents

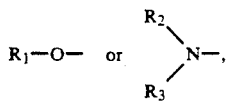

$R_1$ represents a saturated, aliphatic $C_{1-24}$ hydrocarbon radical optionally containing 1 or 2 oxygen atoms in the form of ether groups; an unsaturated, aliphatic $C_{2-24}$ hydrocarbon radical; a saturated or unsaturated, cycloaliphatic $C_{3-8}$ hydrocarbon radical optionally containing 1 to 3 hetero atoms selected from the group consisting of oxygen, sulfur and nitrogen; an aromatic $C_{6-10}$ hydrocarbon radical; or an araliphatic hydrocarbon radical containing 6 to 10 carbon atoms in the aryl moiety and 1 to 14 carbon atoms in the aliphatic moiety, $R_2$ and $R_3$ may be the same or different and represent a saturated, aliphatic $C_{1-18}$ hydrocarbon radical; an unsaturated, aliphatic $C_{2-18}$ hydrocarbon radical; a saturated or unsaturated, cycloaliphatic $C_{3-8}$ hydrocarbon radical optionally containing 1 to 3 hetero atoms selected from the from the group consisting of oxygen, sulfur and nitrogen; an aromatic $C_{6-10}$ hydrocarbon radical; or an araliphatic hydrocarbon radical containing 6 to 10 carbon atoms in the aryl moiety and 1 to 14 carbon atoms in the aliphatic moiety;

Z represents components (a) and (b)

$$-CH_2-\underset{\underset{R_4}{|}}{CH}- \qquad (a)$$

$$-CH_2-CH_2 \qquad (b)$$

wherein
$R_4$ represents a saturated, aliphatic $C_{1-18}$ hydrocarbon radical; or an araliphatic hydrocarbon radical containing 6 to 10 carbon atoms in the aryl moiety and 1 to 14 carbon atoms in the aliphatic moiety,
the percentage content of component (a) in Z being from 0 to 40% by weight and the percentage content of component (b) in Z being from 60 to 100% by weight;
X represents —NH—, —O— or —$(CH_2)_{1-4}$—,
l is 5 to 60,
m is 4 or 5 and
n is 1, 2, 3, 4 or 5.

2. The polyurethane ionomer of claim 1 which contains 15 to 50 milliequivalents of cationic groups per 100 g ionomer, 5 to 25% by weight of ethylene oxide units and 5 to 35% by weight of polyetherester units wherein $R_1$ represents a saturated, aliphatic $C_{4-18}$ hydrocarbon radical optionally containing 1 or 2 oxygen atoms in the form of ether groups; an unsaturated, aliphatic $C_{4-18}$ hydrocarbon radical; a saturated or unsaturated, cycloaliphatic $C_{5-7}$ hydrocarbon radical optionally containing 1 to 3 hetero atoms selected from the group consisting of oxygen, sulfur and nitrogen; phenyl or naphthyl; or an araliphatic hydrocarbon radical containing phenyl or naphthyl in the aryl moiety and 1 to 14 carbon atoms in the aliphatic moiety, $R_2$ and $R_3$ may be the same or different and represent a saturated, aliphatic C hydrocarbon radical; an unsaturated, aliphatic $C_{2-8}$ hydrocarbon radical; a saturated or unsaturated, cycloaliphatic $C_{5-7}$ hydrocarbon radical optionally containing 1 to 3 hetero atoms from the oxygen/sulfur/nitrogen series; phenyl or naphthyl; an araliphatic hydrocarbon radical containing phenyl or naphthyl in the aryl moiety and 1 to 14 carbon atoms in the aliphatic moiety;

$R_4$ represents methyl or an araliphatic hydrocarbon radical containing phenyl or naphthyl in the aryl moiety and 1 to 14 carbon atoms in the aliphatic moiety, the percentage content of component (a) in Z being from 0 to 20% by weight and the percentage content of component (b) in Z being from 80 to 100% by weight, X represents —NH—,
l is 25 to 50.

3. The polyurethane ionomer of claim 1 wherein said polyurethane ionomer additionally contains acylated urea groups corresponding to the formula $$-NH-CO-\underset{|}{N}-CO-R. \qquad (III)$$

4. The polyurethane ionomer of claim 2 wherein said polyurethane ionomer additionally contains acylated urea groups corresponding to the formula $$-NH-CO-\underset{|}{N}-CO-R. \qquad (III)$$

5. A process for the production of the polyurethane ionomer of claim 1 which comprises
a) reacting a polyisocyanate with a compound containing isocyanate-reactive groups to form a polyurethane skeleton which contains no ionic groups,
b) reacting a portion of the isocyanate groups of said polyisocyanate before or during the reaction step set forth in a) with a monohydroxy polyetherester corresponding to the formula $$Y\!-\!\!\left[Z\!-\!O\right]_{l}\!\!\left[\!\begin{matrix}O\\\|\\C\!-\!(CH_2)_m\!-\!O\end{matrix}\!\right]_{n}\!\!H \qquad (II)$$

wherein Y, Z, l, m and n are as defined in claim 1,
c) converting the reaction product obtained from steps a) and b) into an isocyanate group-containing intermediate, if necessary, and
d) introducing ionic or potential ionic groups into the polyurethane ionomer by reacting said intermediate with a compound containing ionic or potential ionic groups and at least one other isocyanate-reactive group.

6. The process of claim 5 wherein said compound containing isocyanate-reactive groups comprises a member selected from the group consisting of dihydroxy compounds, polyhydroxy compounds, monoamino compounds and diamino compounds, and said polyisocyanate and said compound containing isocyanate-reactive groups each contain one or more substituents R per molecule wherein R is a saturated or unsaturated, monohydric aliphatic hydrocarbon radical containing 9 to 22 carbon atoms, a monohydric aromatic hydrocarbon radical containing 6 to 10 carbon atoms or a monohydric araliphatic hydrocarbon radical containing 7 to 10 carbon atoms, provided that when several substituents R are present in the same molecule, different substituents R corresponding to the above definition may be present.

7. The process of claim 6 wherein the polyisocyanate contains acylated urea groups corresponding to the formula $$-NH-CO-N-CO-R. \qquad \text{(III)}$$

8. An aqueous composition comprising the polyurethane ionomer of claim 1 and a polymer containing perfluoroalkyl groups.

9. The aqueous composition of claim 8 wherein said polymer containing perfluoroalkyl groups comprise a member selected from the group consisting of perfluoroalkyl-functional vinyl, styrene, vinylidene, acrylate, methacrylate and α-chloroacrylate polymers and copolymers containing 4 to 20 carbon atoms in the perfluoroalkyl monomer.

10. The aqueous composition of claim 9 wherein said polymer containing perfluoroalkyl groups comprises an acrylate polymer or copolymer having fluorine content of 35 to 45% by weight.

* * * * *